United States Patent Office 2,934,496
Patented Apr. 26, 1960

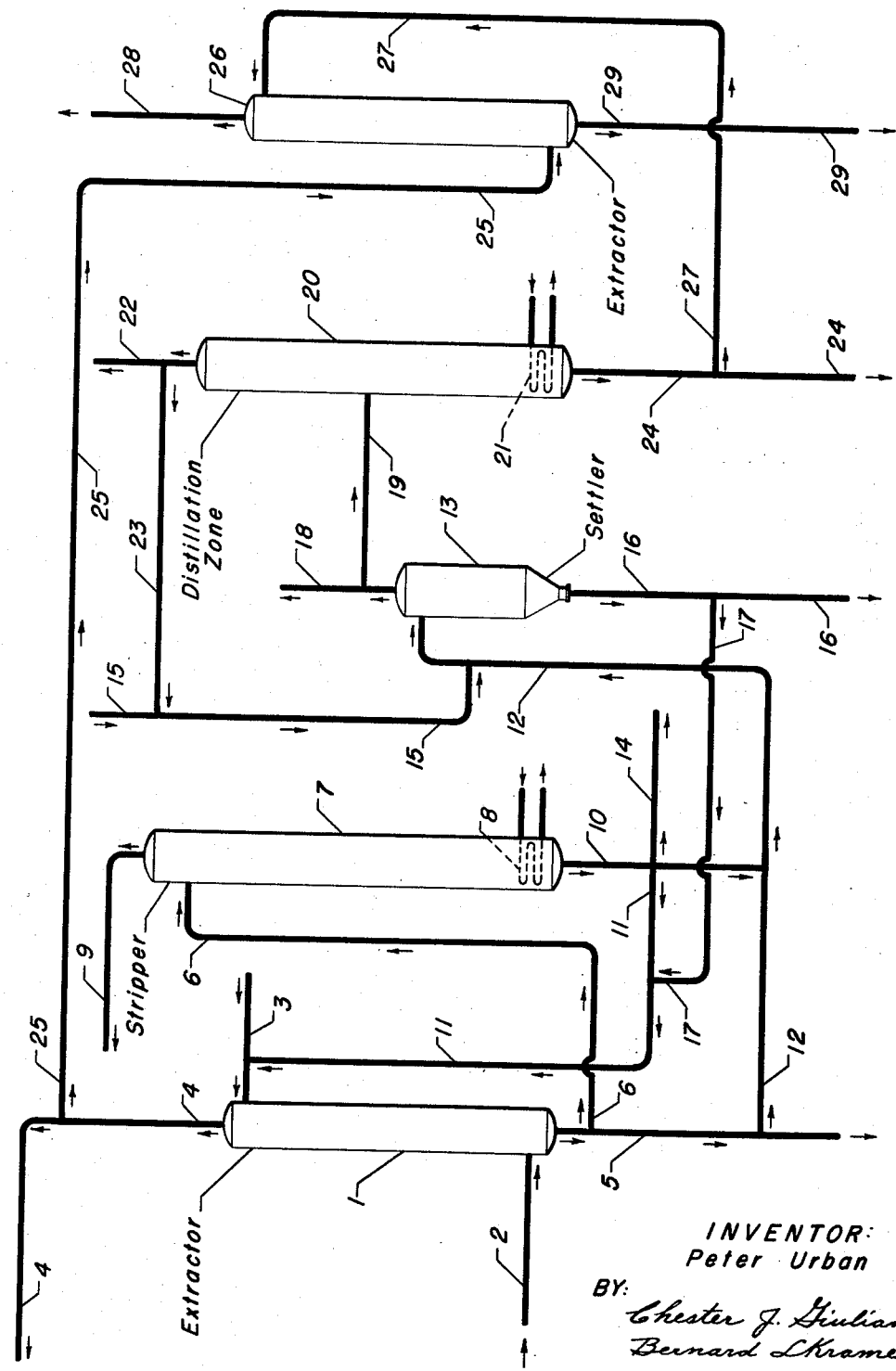

2,934,496

RECOVERY OF USEFUL ALKALINE SOLUTIONS FROM SPENT ALKALINE SOLUTIONS

Peter Urban, Chicago, Ill., assignor, by mesne assignments, to Universal Oil Products Company, Des Plaines, Ill., a corporation of Delaware Application April 4, 1956, Serial No. 576,119

10 Claims. (Cl. 208—235)

This invention relates to a novel method of recovering useful alkaline solutions which have become spent during use in the refinery and which otherwise are to be discarded. Disposal of such spent alkaline solutions presents a serious problem to most refiners because they can not be dumped into neighborhood streams because of contamination of the stream. Therefore, many refiners have resorted to expensive methods of neutralizing the spent alkaline solutions prior to discarding the same. The present invention offers a novel method of recovering useful alkaline solution from the spent solution and thereby considerably improving the economics of the use of such alkaline solutions and also considerably decreasing the quantity of spent alkaline solution to be disposed of.

Alkaline solutions and particularly sodium hydroxide solutions, herein referred to as caustic solutions, are used to a considerable extent for removing acidic components from hydrocarbon fractions. The hydrocarbon fractions may be normally gaseous hydrocarbons including liquefied petroleum gases, gasoline, naphtha, kerosene, gas oil, diesel fuel, burner oils, fuel oil, lubricating oils, etc., or mixtures thereof. While sodium hydroxide solutions generally are preferred, potassium hydroxide solutions may be used, as well as other alkali metal hydroxide solutions including those of lithium, rubidium and cesium. The last three normally are too expensive for commercial use and, therefore, will find application only in special situations. In some cases, the alkaline earth metal hydroxides are employed, including those of calcium, strontium and barium. It is understood that the term "alkaline solution" in the present specifications and claims is intended to include the various alkaline solutions utilized for removing acidic components from organic substances and particularly hydrocarbons.

In the interest of simplicity, the following specifications will be directed primarily to the use of caustic solution (sodium hydroxide soltuion), with the understanding that the other alkaline solutions are encompassed in the broad scope of the present invention.

As hereinbefore set forth, caustic solution is used to remove acidic components from organic substances and particularly hydrocarbons. For example, in the treatment of gasoline, naphtha, kerosene, gas oil, diesel fuel, burner oil, fuel oil, etc. which may be straight run, thermally or catalytically cracked, or mixtures thereof, the caustic solution serves to remove acidic components, including mercaptans, phenols, naphthenic acids, etc. The treatment may be effected either in a batch or a continuous type of operation, the latter generally including a regenerative continuous system in which the caustic is continuously or intermittently regenerated and the regenerated caustic recycled for further use in the process. Regardless of the system employed, a stage is reached where the caustic becomes saturated with the acidic components, generally in the form of sodium salts thereof, and the caustic solution no longer serves the purpose of extracting the acidic components from the hydrocarbon distillate. At this stage, the refiner normally discards the caustic. As mentioned earlier, the present invention offers a novel method of recovering useful caustic solution from this spent caustic solution.

In one embodiment the present invention relates to a method of recovering useful alkaline solution from an alkaline solution which has become spent in use to remove acidic components from organic substances, which comprises commingling with said spent alkaline solution, a reagent selected from the group consisting of alcohols, ketones and amines, each contining at least three carbon atoms, settling the mixture to separate an upper phase comprising organic compounds and a lower phase comprising alkaline solution of a concentration greater than that of the first mentioned spent alkaline solution.

In a specific embodiment the present invention relates to a method of recovering useable caustic solution from caustic solution which has become spent in use to remove acidic components from hydrocarbon distillate, which comprises commingling methyl ethyl ketone with said spent caustic solution, settling the mixture to separate an upper phase comprising organic compounds and a lower phase comprising caustic solution in a concentration greater than that of the first mentioned spent caustic solution.

The invention will be explained further with reference to the accompanying flow diagrammatic drawing which illustrates several specific embodiments of the invention. It is understood that the broad scope of the invention is not limited to the embodiments illustrated in the drawing.

Referring to the drawing, extractor 1 is a conventional contacting zone wherein the charge and caustic solution are intimately contacted. In a batch type operation, a pool of caustic solution is maintained in extractor 1 and the charge is passed therethrough and removed from the upper portion of the extractor. The charge containing acidic components is introduced through line 2 into zone 1, while the caustic may be introduced thereto by way of line 3. The treated charge now reduced in acidic components is withdrawn from the upper portion of extractor 1 through line 4, while the spent caustic solution is removed from the lower portion of extractor 1 through line 5. In a continuous type of operation, caustic solution is continuously introduced through line 3, and the spent caustic solution is continuously withdrawn through line 5 and passed by way of line 6 to stripper 7. In stripper 7 the caustic is regenerated by hydrolysis in a conventional manner to convert the sodium salts to sodium hydroxide and acidic components. In the case here illustrated, reboiler 8 is disposed in the lower portion of stripper 7. It is understood that steam stripping or other suitable means may be employed for regenerating the caustic solution. The acidic components liberated in stripper 7 are withdrawn therefrom through line 9, and the regenerated caustic solution is withdrawn from the lower portion of stripper 7 through line 10 and is recycled by way of lines 11 and 3 to extractor 1 for further use therein.

As hereinbefore set forth, extractor 1 and stripper 7 are conventional methods of present operations. The extraction generally is effected at ambient temperature, although elevated temperatures up to about 200° F. may be employed. The stripping likewise is effected at a temperature below about 200° F., although it is understood that higher temperatures may be employed with higher pressures. The caustic solution is maintained in liquid phase and therefore the temperature and pressure are selected to meet these requirements.

In prior operations, after the caustic solution in zone 1 in batch type operation, or the caustic solution from zone 7 in continuous regenerative operation, becomes saturated with acidic components, so that it is no longer useable for extracting acidic components from the charge, the caustic solution would be disposed of in any suitable manner. However, in accordance with the present invention, at least a portion of the caustic solution is directed either from zone 1 by way of lines 5 and 12 or by way of lines 10 and 12 to settler 13. When desired, a portion of the caustic solution from extractor 1 may be removed from the process by way of the extension to line 5 or the caustic solution from stripper 7 may be removed from the process by way of line 14. However, in accordance with the present invention, at least a portion and preferably all of the caustic solution is directed by way of line 12 to settler 13.

Commingled with the caustic solution being directed to settler 13 or introduced directly to the settler, by well-known means not illustrated, is an alcohol, ketone or amine containing at least 3 carbon atoms each. In the case illustrated in the drawing, the alcohol, ketone or amine is introduced through line 15 and passed by way of line 12 to settler 13.

It has been found that an alcohol, ketone or amine having at least 3 carbon atoms each serves to separate two layers in the settling zone, as will be shown by the examples appended to the present specifications. It is essential that the alcohol, ketone or amine contains at least 3 carbon atoms. The examples will show that methanol does not effect the desired separation of layers and that ethanol likewise is not sufficiently effective to form the separation of layers at the desired rate. Any suitable alcohol, ketone or amine meeting the requirements hereinbefore set forth may be employed in the present process. Of the alcohols, the secondary alcohols appear to be preferred, thus including isopropyl alcohol, isobutyl alcohol, isoamyl alcohol, isohexyl alcohol, isoheptyl alcohol, isooctyl alcohol, etc. Suitable ketones include acetone, methyl ethyl ketone, methyl propyl ketone, methyl butyl ketone, methyl amyl ketone, methyl hexyl ketone, methyl heptyl ketone, etc., diethyl ketone, ethyl propyl ketone, ethyl butyl ketone, ethyl amyl ketone, ethyl hexyl ketone, ethyl heptyl ketone, etc., dipropyl ketone, propyl butyl ketone, propyl amyl ketone, propyl hexyl ketone, propyl heptyl ketone, etc., dibutyl ketone, butyl amyl ketone, butyl hexyl ketone, butyl heptyl ketone, dihexyl ketone, diheptyl ketone, etc. Suitable amines include propyl amine, butyl amine, amyl amine, hexyl amine, heptyl amine, octyl amine, etc., propylene diamine, diethylene triamine, dipropylene triamine, triethylene tetramine, tripropylene tetramine, tetraethylene pentamine, tetrapropylene pentamine, etc. Of the alkyl amines, it generally is preferred that a tertiary alkyl amine be employed as, for example, tertiary butyl amine, tertiary amyl amine, etc. It is understood that a mixture of alcohols, ketones and/or amines may be employed when desired.

Referring again to the drawing, the mixture of caustic solution and alcohol ketone or amine are allowed to settle in zone 13. Preferably intimate mixing of the alcohol, ketone or amine and spent caustic solution is effected before settling and this may be effected in any suitable manner, including the use of orifice meters, duriron mixers, circulating pumps, etc. In accordance with the present invention, a separation of phases will occur, the upper phase being drak in color and comprising organic material, including the alcohol, ketone or amine and naphthenic acids, etc., but also will contain a small concentration of useable caustic. On the other hand, the lower phase will be rich in useable caustic, although it will contain minor amounts of spent caustic, naphthenic acids, and the like. However, the concentration of useable caustic in the lower layer will be considerably higher than that of the spent caustic introduced to the settler.

In a broad embodiment of the present invention, the lower layer is withdrawn from settler 13 by way of line 16 and, while it may be removed from the process for whatever desired use, it preferably is directed by way of lines 17, 11 and 3 to extractor 1 for further use in the removal of acidic components from the hydrocarbon distillate.

As a continuous process, the upper layer is withdrawn from settler 13 by way of line 18 and, while it may be withdrawn for any desired use, at least a portion thereof is directed by way of line 19 to distillation zone 20. In distillation zone 20, the alcohol, ketone or amine is separated from the other components of the mixture, preferably by distillation, although other suitable methods may be used. In the case illustrated, internal reboiler 21 is provided in the lower portion of zone 20. The alcohol, ketone or amine is removed from the upper portion of zone 20 by way of line 22 and, while all or a portion may be withdrawn from the process, at least a portion is recycled by way of lines 23, 15 and 12 to settler 13 for further use therein.

The undistilled material is withdrawn from zone 20 by way of line 24. This fraction will be rich in naphthenic acids and, in one embodiment of the invention, may be treated by conventional means to concentrate and recover the cresylic acids. However, this fraction also contains useable caustic as hereinbefore set forth. It has been found that this fraction appears to be a particularly good solvent for sodium mercaptides and therefore may be utilized in a combination process for removing the residual high molecular weight mercaptans not removed in extractor 1. In this embodiment of the invention, the treated hydrocarbon charge withdrawn from extractor 1 by way of line 4 is directed through line 25 into extractor 26, to be passed countercurrently therein to the upper layer withdrawn from the lower portion of zone 20 by way of line 24 and then directed through line 27 to extractor 26. The finally treated hydrocarbon distillate is withdrawn from the upper portion of zone 26 by way of line 28. The finally spent caustic solution is withdrawn from the lower portion of extractor 26 by way of line 29 and now may be discarded or subjected to any further treatment as desired.

From the description of the invention hereinbefore set forth, it will be noted that the novel process provides an important means of obtaining more economical utilization of spent caustic solutions and also provides, in the combination process, a means of obtaining even greater removal of acidic components from hydrocarbon distillates. In still another embodiment it provides a means for concentrating and recovering cresylic acids.

As hereinbefore set forth, the novel feature of the present invention may be employed to recover useable caustic from spent caustic solutions. It is particularly adapted for use with caustic solutions having an original concentration of 20° Baumé or higher. In most cases, the settling is effected at ambient temperature, although it is understood that higher temperatures, which generally will not exceed about 200° F., may be employed. Here again, liquid phase separation is desired in the settler and superatmospheric pressure should be employed with temperatures which would induce vapor phase at lower pressures. The amount of alcohol, ketone or amine which is required to effect practical separations will vary with the particular spent caustic solution being treated, but in general will comprise from about 5 to about 25% by volume of the caustic solution, although it is understood that higher concentrations up to 75% by volume or more may be employed when desired.

In the interest of simplicity, pumps, valves, heaters and similar appurtenances have been omitted from the drawing, with the understanding that they will be provided as required.

The following examples are introduced to illustrate further the novelty and utility of the present invention but not with the intention of unduly limiting the same.

EXAMPLE I

35° Baumé caustic solution was utilized at atmospheric temperature in a regenerative caustic system to treat thermally cracked gasoline containing mercaptans, phenols, etc. The caustic solution was used until it became saturated with acidic impurities and was no longer effective in removing acidic components from the thermally cracked gasoline.

The spent caustic solution was subjected to oxidation with oxygen at 185° F. for 1 hour. Approximately 5% by volume of methyl ethyl ketone was commingled with a portion of the spent caustic solution, the mixture agitated and then settled. A separation of two phases occurred. The lower phase comprised 40% by volume and was a light amber color liquid, while the upper phase comprised 60% by volume and was a dark red fluid. The properties of the original spent caustic solution and the upper and lower phases are shown in the following table.

Table I

|  | Original Sample, percent | Lower Phase, percent | Upper Phase, percent |
|---|---|---|---|
| Useable Caustic | 25 | 33.5 | 13.6 |
| Spent Caustic | 4.5 | 0.6 | 8.6 |

From the data in the above table, it will be noted that the ratio of useable caustic to spent caustic increased from 5.5 to 1 in the original sample to 55 to 1 in the lower phase, and that the upper phase contained 94% of the spent caustic.

EXAMPLE II

As hereinbefore set forth, it is essential that the alcohol contains at least 3 carbon atoms to the molecule. This is demonstrated by the following runs in which another sample of the spent caustic described in Example I was split into several portions. Methyl alcohol, ethyl alcohol, isopropyl alcohol and isobutyl alcohol were each separately added to different portions of the spent caustic solution, mixed and then allowed to settle.

The methyl alcohol was added in three different concentrations to separate portions of the spent caustic, these concentrations being 4, 20 and 40% by volume of spent caustic solution and the mixtures agitated and then allowed to settle. In all cases, a homogeneous phase remained, and there was no separation of phases.

Ethyl alcohol similarly was commingled in different proportions to separate portions of the spent caustic solution. When the ethyl alcohol was commingled in concentrations of 4 and 8% by volume of the spent caustic solution, no separation of phases occurred.

Isopropyl alcohol was commingled with another portion of the spent caustic solution in a concentration of 8% by volume, the mixture agitated and then allowed to settle. A separation of two layers occurred, the upper layer comprising 64% by volume and the lower layer comprising 36% by volume of the spent caustic solution. Similar separations occurred when using about 14 and about 20 volume percent of isopropyl alcohol.

8% by volume of isobutyl alcohol was mixed and agitated with another portion of the spent caustic solution, and the mixture settled into two phases, an upper phase comprising 60% by volume and the lower phase comprising 40% by volume. Similar phase separations were effected when mixing about 13% and about 18% of isobutyl alcohol with the spent caustic solution.

EXAMPLE III

Another portion of the spent caustic solution described in Example I was mixed and agitated with 5% by volume of acetone at 122° F., and the mixture allowed to settle at this temperature. There was a rapid separation of phases, the upper phase comprising 62% by volume and the lower phase comprising 38% by volume.

EXAMPLE IV

Diethylene triamine was mixed in a proportion of 5% by volume with another portion of the spent caustic solution described in Example I, agitated and then settled at 122° F. Here again, there was a rapid separation of two phases, the upper phase comprising 62.5% by volume and the lower phase comprising 37.5% by volume.

EXAMPLE V

Tert-butyl amine was mixed at 122° F. in a concentration of 5% by volume with another portion of spent caustic solution, the mixture agitated and then allowed to settle. Two phases were separated, the upper phase comprising 77.5% by volume and the lower phase comprising 22.5% by volume.

EXAMPLE VI

As a specific example of the combination process illustrated in the drawing, a thermally cracked gasoline is subjected at ambient temperature to countercurrent contact with a 35° Baumé caustic solution. The used caustic is continuously regenerated by steam stripping and reused until the phenols and naphthenic acids accumulate in the caustic to 10–20 volume percent of the caustic. 5% of acetone is added to the caustic solution, with mixing, and the mixture allowed to settle into two phases. The lower phase is withdrawn and sent to the extractor for further use in the process. The upper phase is subjected to distillation to remove most of the acetone which is reused for commingling with additional quantities of spent caustic solution. The treated gasoline from the first extractor is then countercurrently contacted in the second extractor with the upper phase which has been freed of acetone. The latter treatment serves to remove residual mercaptans, and particularly the high molecular weight mercaptans, which were not removed in the first stage of the process. In this combination process, the caustic in the first stage may be used for a longer time than otherwise because of the second stage extraction which removes any mercaptans not removed in the first stage. The caustic recovered from the second stage extractor is high in naphthenic acids and is further treated to concentrate the naphthenic acids for sale.

I claim as my invention:

1. The method of recovering useable alkaline solution from alkaline solution which has become spent in use to remove acidic components from petroleum fractions, which comprises adding to and commingling with said spent alkaline solution from about 5% to about 75% by volume of a reagent selected from the group consisting of alcohols, ketones and amines each containing at least 3 carbon atoms, and settling the mixture of spent alkaline solution and added reagent to separate an upper phase comprising organic compounds and a lower phase comprising alkaline solution of a concentration greater than that of the first mentioned spent alkaline solution.

2. The method of recovering useable caustic solution from caustic solution which has become spent in use to remove acidic components from petroleum fractions, which comprises adding to and commingling with said spent caustic solution from about 5% to about 75% by volume of a reagent selected from the group consisting of alcohols, ketones and amines each containing at least 3 carbon atoms, and settling the mixture of spent caustic solution and added reagent to separate an upper phase comprising organic compounds and a lower phase comprising caustic solution of a concentration greater than that of the first mentioned spent caustic solution.

3. The method of claim 2 further characterized in that said reagent is acetone.

4. The method of claim 2 further characterized in that said reagent is methyl ethyl ketone.

5. The method of claim 2 further characterized in that said reagent is isopropyl alcohol.

6. The method of claim 2 further characterized in that said reagent is isobutyl alcohol.

7. The method of claim 2 further characterized in that said reagent is diethylene triamine.

8. The method of recovering useable caustic solution from caustic solution which has become spent in use to remove acidic components from petroleum fractions, which comprises adding to and commingling with said spent caustic solution from about 5% to about 75% by volume of a reagent selected from the group consisting of alcohols, ketones and amines each containing at least 3 carbon atoms, settling the mixture of spent caustic solution and added reagent to separate an upper phase comprising organic compounds and a lower phase comprising caustic solution of a concentration greater than that of the first mentioned spent caustic solution, and utilizing said lower phase to remove acidic components from a petroleum fraction.

9. The process which comprises treating a petroleum distillate containing acidic components with an alkaline solution to remove a major portion of said acidic components, subsequently separating a spent alkaline solution saturated with acidic components, adding to and commingling with said spent alkaline solution from about 5% to about 75% by volume of a reagent selected from the group consisting of alcohols, ketones and amines each containing at least 3 carbon atoms, settling the mixture of spent alkaline solution and added reagent to separate an upper phase comprising organic compounds and a lower phase comprising alkaline solution, using said lower phase to remove acidic components from another portion of said petroleum distillate, and contacting the thus treated distillate with at least a portion of said upper phase to further remove acidic components from said treated distillate.

10. The process which comprises treating a petroleum fraction containing acidic components with caustic solution to remove a major portion of said acidic components, subsequently separating spent caustic solution saturated with acidic components, adding to and commingling with said spent caustic solution from about 5% to about 75% by volume of a reagent selected from the group consisting of alcohols, ketones and amines each containing at least 3 carbon atoms, settling the mixture of spent caustic solution and added reagent to separate an upper phase comprising organic compounds and a lower phase comprising caustic solution, using said lower phase to remove acidic components from another portion of said petroleum fraction, and contacting the thus treated hydrocarbon fraction with at least a portion of said upper phase to further remove acidic components from said treated fraction.

References Cited in the file of this patent

UNITED STATES PATENTS

| | | |
|---|---|---|
| 2,446,868 | Cunningham | Aug. 10, 1948 |
| 2,550,091 | Seebold | Apr. 24, 1951 |
| 2,758,058 | Schneider et al. | Aug. 7, 1956 |
| 2,850,434 | Brooks et al. | Sept. 2, 1958 |